(12) United States Patent
Kojima et al.

(10) Patent No.: US 12,528,030 B2
(45) Date of Patent: Jan. 20, 2026

(54) GAS-LIQUID SEPARATION MECHANISM OF RESERVE TANK

(71) Applicant: SUBARU CORPORATION, Tokyo (JP)

(72) Inventors: Momoka Kojima, Tokyo (JP); Keita Gomi, Tokyo (JP); Youhei Hashimoto, Tokyo (JP); Takuji Yoshikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 316 days.

(21) Appl. No.: 18/343,464

(22) Filed: Jun. 28, 2023

(65) Prior Publication Data

US 2024/0017189 A1   Jan. 18, 2024

(30) Foreign Application Priority Data

Jul. 12, 2022   (JP) .................................. 2022-111657

(51) Int. Cl.
  *B01D 19/00*   (2006.01)
(52) U.S. Cl.
  CPC .............................. *B01D 19/0042* (2013.01)
(58) Field of Classification Search
  CPC ..... B01D 19/0042; B01D 19/00; F01P 11/028
  See application file for complete search history.

(56) References Cited

U.S. PATENT DOCUMENTS

| | | | |
|---|---|---|---|
| 4,064,848 A * | 12/1977 | Pabst | F01P 11/029 123/41.51 |
| 6,216,646 B1 * | 4/2001 | Smith | F01P 11/029 165/104.32 |
| 6,355,096 B1 * | 3/2002 | Schmidtke | B01D 19/00 96/204 |
| 10,946,312 B2 * | 3/2021 | Elkenkamp | B01D 19/0042 |
| 2006/0043204 A1 * | 3/2006 | Ito | F01P 11/028 237/12.3 A |
| 2008/0190385 A1 * | 8/2008 | Bangert | F01P 11/029 123/41.44 |

(Continued)

FOREIGN PATENT DOCUMENTS

| | | |
|---|---|---|
| JP | 2017-078399 A | 4/2017 |
| JP | 2020-186684 A | 11/2020 |
| JP | 2021-169815 A | 10/2021 |

*Primary Examiner* — Jennifer Dieterle
*Assistant Examiner* — Phillip Y Shao
(74) *Attorney, Agent, or Firm* — Smith, Gambrell & Russell, LLP (57) ABSTRACT

A gas-liquid separation mechanism of a reserve tank for separating gas bubbles contained in a coolant flowing into a reserve tank provided in a circulation path of the coolant includes: an inlet opening for the coolant provided on a first side wall of the reserve tank; an outlet opening for the coolant provided on a second side wall opposite to the first side wall; a bubble emission port that is provided on an upper wall of the reserve tank and emits the bubbles separated from the coolant; a flow adjuster that adjusts a flow of the coolant having flowed in from the inlet opening and makes the flow rise and flow backward; and a first small wall that is provided in a vicinity of the bubble emission port and downstream of the bubble emission port in a direction where the flow flows backward, and protrudes downward from the upper wall.

17 Claims, 10 Drawing Sheets

(56) References Cited

U.S. PATENT DOCUMENTS

| | | | |
|---|---|---|---|
| 2020/0155970 A1* | 5/2020 | Gaikwad | B01D 19/0031 |
| 2020/0324232 A1* | 10/2020 | Mishima | B01D 45/08 |
| 2021/0001354 A1* | 1/2021 | Sakata | F01P 11/028 |
| 2022/0065157 A1 | 3/2022 | Miyagawa et al. | |
| 2022/0099018 A1* | 3/2022 | Sakata | F01P 11/028 |
| 2023/0035792 A1 | 2/2023 | Miyagawa et al. | |

* cited by examiner

GAS-LIQUID SEPARATION MECHANISM OF RESERVE TANK

CROSS-REFERENCE TO RELATED APPLICATIONS

The present application claims priority from Japanese Patent Application No. 2022-111657 filed on Jul. 12, 2022, the entire contents of which are hereby incorporated by reference.

BACKGROUND

The disclosure relates to a gas-liquid separation mechanism of a reserve tank provided in a circulation path of a coolant.

For example, a vehicle is provided with a cooling system that cools heat generating equipment such as an engine and a power conversion device by circulating a coolant. In this cooling system, the coolant circulates through the circulation path constituting a closed loop so that the heat generating equipment is cooled. The coolant that has been used to cool the heat generating equipment and has reached a high temperature is cooled by, for example, heat exchange with outside air in a heat exchanger such as a radiator. The coolant that has reached a low temperature by this cooling is used to cool the heat generating equipment again. Such an action is continuously repeated, and thus the heat generating equipment is cooled, and its temperature is kept a certain value or lower.

A reserve tank for storing the coolant is provided upstream of a liquid pump in the circulation path of the coolant. The reserve tank serves to replenish the cooling circuit with the coolant and to absorb a volume change of the coolant due to thermal expansion. The reserve tank is provided with a gas-liquid separation mechanism for separating and removing bubbles contained in the coolant. In this cooling system, before the coolant is suctioned into the liquid pump, the gas-liquid separation mechanism separates and removes the bubbles contained in the coolant from the coolant, so that suction of the bubbles by the liquid pump is suppressed, and an occurrence of a malfunction of the liquid pump due to the suction of the bubbles is suppressed.

As a reserve tank provided with the gas-liquid separation mechanism, for example, Japanese Unexamined Patent Application Publication (JP-A) No. 2017-078399 discloses an expansion tank including a tank body defining a storage chamber that stores a coolant and a coolant outlet opening toward the storage chamber at a lower portion of the tank body. The tank body includes an internal structure including an opening port that opens downward toward the coolant outlet and defining a pressure chamber opened toward the storage chamber only by the opening port. According to such an expansion tank, generation of a swirl flow can be suppressed, and a large number of bubbles can be suppressed from flowing out to the circulation path of the coolant at once, without increasing the tank body in size.

Japanese Unexamined Patent Application Publication (JP-A) No. 2020-186684 proposes a reserve tank including a gas-liquid separator including an internal space that separates cooling water into gas and liquid, an inlet including an opening for supplying the cooling water to the internal space, an outlet including an opening for emitting the cooling water from the internal space, and a protrusion protruding upward from the bottom of the internal space. In this reserve tank, a portion between an inner peripheral surface of the gas-liquid separator and an outer peripheral surface of the protrusion is an annular flow path. The reserve tank can stably serve to suppress generation of bubbles and stably serve to remove bubbles.

Japanese Unexamined Patent Application Publication (JP-A) No. 2021-169815 proposes a reserve tank including a gas-liquid separator, an inflow portion, an outflow portion, and a cylindrical protrusion. The gas-liquid separator has a bottomed cylindrical shape around a predetermined axis, the inflow portion causes the cooling water to flow into the gas-liquid separator, and the protrusion extends from a bottom wall along the predetermined axis inside the gas-liquid separator. At a tip end of the protrusion, an internal space of the protrusion opens to the internal space of the gas-liquid separator. Such a reserve tank can stably serve to suppress generation of bubbles and stably serve to remove bubbles.

SUMMARY

An embodiment of the disclosure provides a gas-liquid separation mechanism of a reserve tank. The gas-liquid separation mechanism is configured to separate gas bubbles contained in a coolant flowing into a reserve tank provided in a circulation path of the coolant. The gas-liquid separation mechanism includes an inlet opening for the coolant, an outlet opening for the coolant, a bubble emission port, a flow adjuster, and a first small wall. The inlet opening is provided on a first side wall of the reserve tank. The outlet is provided on a second side wall opposite to the first side wall. The bubble emission port is provided on an upper wall of the reserve tank and configured to emit the gas bubbles separated from the coolant. The flow adjuster is configured to adjust a flow of the coolant having flowed in from the inlet opening and make the flow rise and flow backward. The first small wall is provided in a vicinity of the bubble emission port and downstream of the bubble emission port in a direction where the flow flows backward. The first small wall protrudes downward from the upper wall of the reserve tank.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

The reserve tanks proposed in JP-A No. 2017-078399, JP-A No. 2020-186684, and JP-A No. 2021-169815 have a complicated structure for a gas-liquid separation mechanism, which may increase the manufacturing cost.

It is desirable to provide a gas-liquid separation mechanism of a reserve tank that can efficiently separate gas bubbles contained in a coolant, with a simple configuration.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Configuration of Cooling System

A configuration of a cooling system (provided in a vehicle) including a reserve tank, which is an application example of a gas-liquid separation mechanism according to one embodiment of the disclosure, will be described below with reference to FIG. 8.

Figure 8:
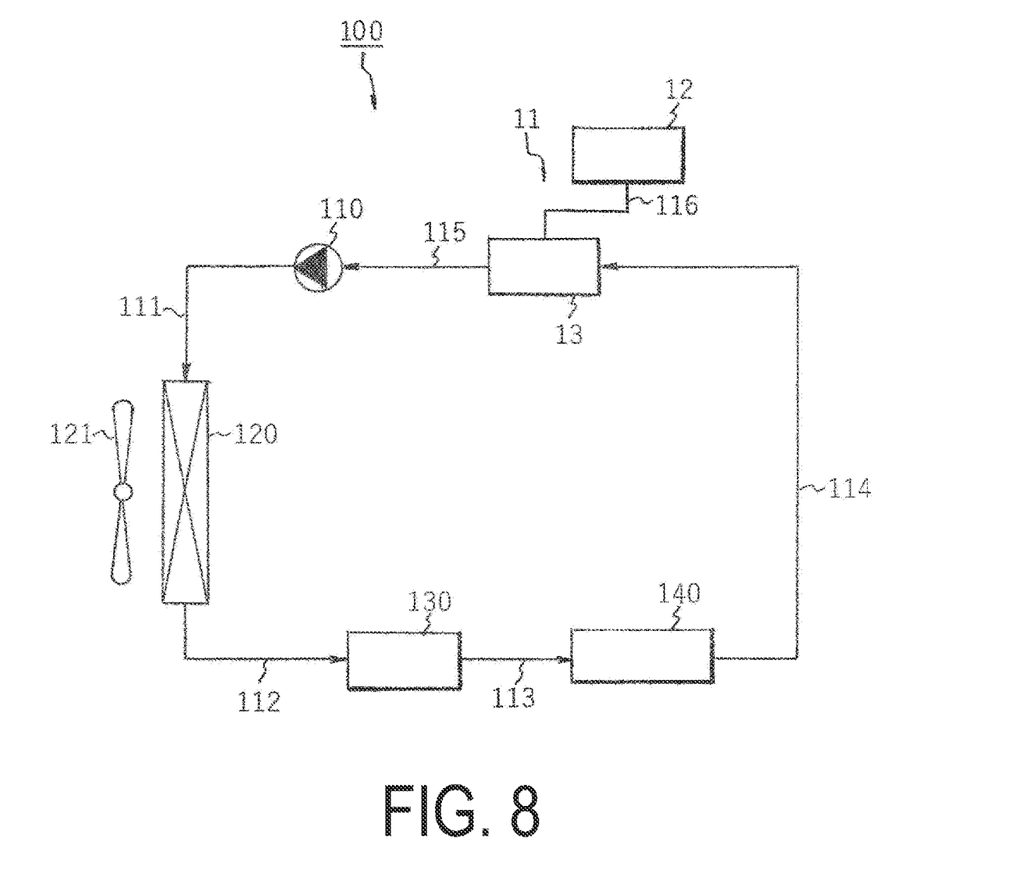
FIG. 8 is a block diagram illustrating a configuration of a cooling system provided in a vehicle.

FIG. 8 is a block diagram illustrating a circulation path of the coolant in the cooling system. In a cooling system 100 illustrated by the drawings, the coolant circulates through the circulation path constituting a closed loop, so that a power conversion device 130 and an oil cooler 140 that are serving as heat generating equipment are cooled and their temperatures are kept to a certain value or lower. The power conversion device 130 includes an inverter (INV), a DC/DC converter, and an on-board charger (OBC). For example, a liquid (antifreeze liquid) containing ethylene glycol, which has high thermal conductivity and is not easily frozen, or the like as a main component is used as the coolant.

A liquid pump 110 for circulating the coolant is provided in the circulation path. A radiator 120, the power conversion device 130, the oil cooler 140, and a sub tank 13 of a reserve tank 11 are sequentially disposed along the flow direction of the coolant discharged from the liquid pump 110. A pipe 111 extending from a discharge side of the liquid pump 110 is coupled to an inlet side of the radiator 120. A pipe 112 extending from an outlet side of the radiator 120 is coupled to an inlet side of the power conversion device 130. A pipe 113 extending from an outlet side of the power conversion device 130 is coupled to an inlet side of the oil cooler 140. A pipe 114 extending from an outlet side of the oil cooler 140 is coupled to an inlet side of the sub tank 13. A pipe 115 extending from an outlet side of the sub tank 13 is coupled to a suction side of the liquid pump 110. The radiator 120 is provided with an electric radiator fan 121 for causing the outside air to pass through the radiator 120 to promote heat exchange between the coolant and the outside air.

In the present embodiment, the reserve tank 11 is divided into a main tank 12 and the sub tank 13, and the gas-liquid separation mechanism 10 is provided in the sub tank 13. The sub tank 13 is provided in the circulation path as described above, and the main tank 12 is disposed at a position above the sub tank 13. The main tank 12 and the sub tank 13 communicate with each other through a communicating pipe 116.

In the cooling system 100 configured as described above, the liquid pump 110 is driven by a part of power of an electric motor (not illustrated) or an engine (not illustrated), so that the coolant is circulated by the liquid pump 110 through a cooling path constituting the closed loop as indicated by arrows in FIG. 8. The power conversion device 130 and the oil cooler 140 that are serving as the heat generating equipment are cooled by the circulating coolant, so that their temperatures are kept to a predetermined value or lower.

That is, the coolant pressurized by the liquid pump 110 is discharged from the discharge side of the liquid pump 110 to the pipe 111 and introduced from the pipe 111 into the radiator 120. The coolant introduced into the radiator 120 is cooled by heat exchange with the outside air passing through the radiator 120 with a blowing action of the rotating radiator fan 121, in a process of the coolant flowing through the radiator 120.

The coolant cooled in the radiator 120 and lowered in temperature flows from the outlet side of the radiator 120 to the pipe 112 and is introduced from the pipe 112 into the power conversion device 130. The coolant flows in the power conversion device 130, so that the power conversion device 130 is cooled, and the coolant used for cooling flows from the outlet side of the power conversion device 130 to the pipe 113. Then, the coolant is introduced from the pipe 113 into the oil cooler 140, and the coolant flows in the oil cooler 140, so that the oil is cooled.

As described above, the coolant that has passed through the oil cooler 140 to cool the oil and has been increased in temperature by heat exchange flows from the outlet side of the oil cooler 140 to the pipe 114 and is introduced from the pipe 114 into the sub tank 13. The sub tank 13 is provided with a gas-liquid separation mechanism 10 illustrated in FIG. 1, which will be described below. Bubbles contained in the coolant flowing into the sub tank 13 are removed by the gas-liquid separation mechanism 10. The coolant from which the bubbles are removed by the gas-liquid separation mechanism 10 flows from the outlet side of the sub tank 13 to the pipe 115 and is suctioned from the pipe 115 to the suction side of the liquid pump 110 to be pressurized. Thereafter, the above-described action is continuously repeated, so that the power conversion device 130 and the oil cooler 140 that are serving as the heat generating equipment are continuously cooled, and their temperatures are kept to a predetermined value or lower.

In the above-described application example of the circulation path of the coolant, the power conversion device 130 and the oil cooler 140 are exemplified as the heat generating equipment that is a cooling target, but the cooling target may include an engine, and other auxiliary devices.

Configurations of Sub Tank and Gas-Liquid Separation Mechanism

Figure 1:
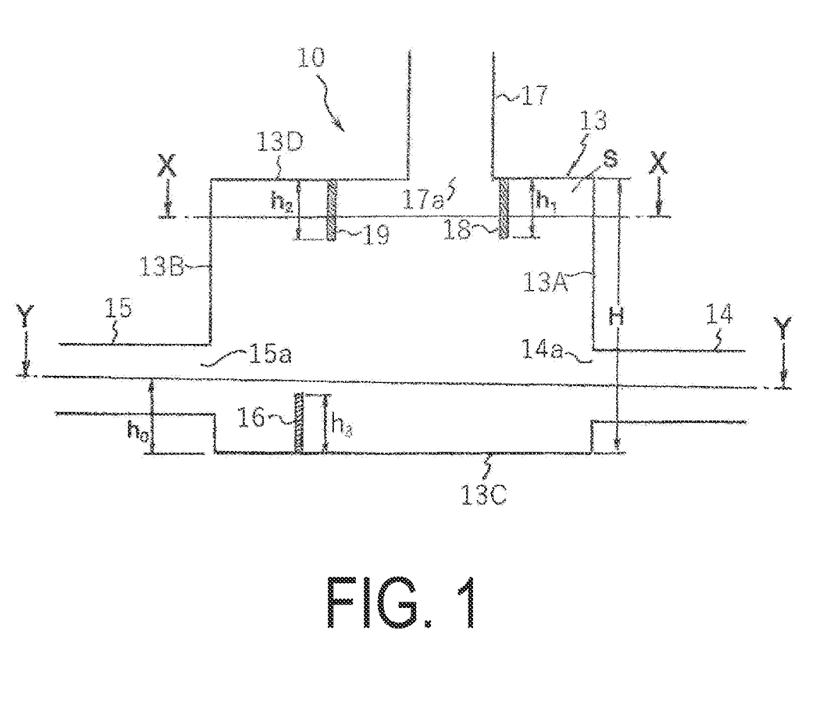
FIG. 1 is a conceptual vertical cross-sectional view of a reserve tank (sub tank) including a gas-liquid separation mechanism according to an embodiment of the disclosure.
Figure 2:
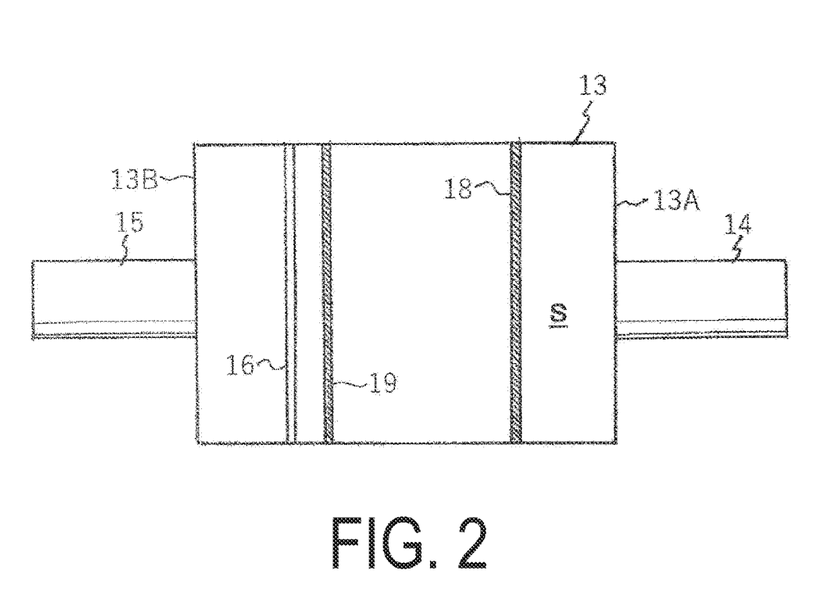
FIG. 2 is a conceptual cross-sectional view taken along line X-X in FIG. 1.
Figure 3:
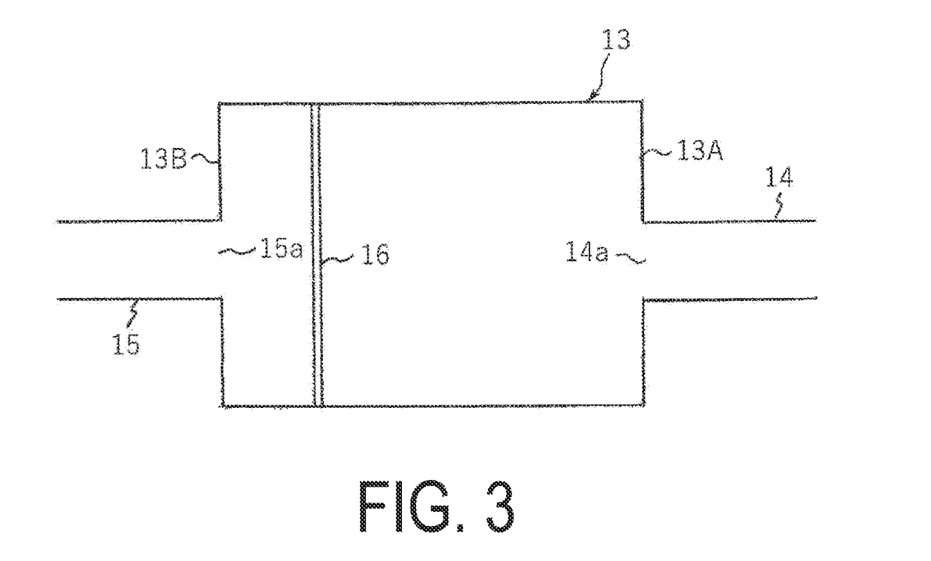
FIG. 3 is a conceptual cross-sectional view taken along line Y-Y in FIG. 1.

Next, configurations of the sub tank 13 and the gas-liquid separation mechanism 10 according to the embodiment of the disclosure provided in the sub tank 13 will be described in detail with reference to FIGS. 1 to 3. FIG. 1 is a vertical cross-sectional view of the sub tank 13 including the gas-liquid separation mechanism 10 according to the embodiment of the disclosure, FIG. 2 is a cross-sectional view taken along line X-X in FIG. 1, and FIG. 3 is a cross-sectional view taken along line Y-Y in FIG. 1.

The gas-liquid separation mechanism 10 includes the sub tank 13 that is serving as the reserve tank 11, an inlet opening 14a and an outlet opening 15a of the coolant, which are provided in the sub tank 13, a bubble emission port 17a for emitting bubbles separated from the coolant, and a flow adjuster. Hereinafter the bubbles are gas bubbles. The flow adjuster adjusts a flow of the coolant having flowed in from the inlet opening 14a to make the flow rise and flow backward. In the present embodiment, a bottom small wall 16 is included as the flow adjuster. The gas-liquid separation mechanism 10 further includes a first small wall 18 and a second small wall 19. Hereinafter, each configuration of the gas-liquid separation mechanism 10 will be described in detail. In the following description, the bubble emission port 17a is also simply referred to as "emission port 17a".

The sub tank 13 illustrated in FIG. 1 is a tank having a substantially rectangular box shape and includes a first side wall 13A including the inlet opening 14a and a second side wall 13B opposite to the first side wall 13A and including the outlet opening 15a. The sub tank 13 includes a bottom wall 13C forming a bottom surface of the tank and an upper wall 13D forming a top surface of the tank. The emission port 17a is provided on the upper wall 13D. The first side wall 13A and the second side wall 13B are substantially vertical walls disposed on the upstream side (right side in FIG. 1) and on the downstream side (left side in FIG. 1), respectively, of the main flow of the coolant flowing through the circulation path. Nipples 14 and 15 having a circular cylindrical shape constituting the inlet flow path and the outlet flow path, respectively, are substantially horizontally coupled to central portions in the width directions of the lower portions of the first and second side walls 13A and 13B, respectively (the width direction is a direction perpendicular to the plane in FIG. 1 and a vertical direction in FIGS. 2 and 3). The pipes 114 and 115 illustrated in FIG. 8 are coupled to the nipples 14 and 15, respectively.

A coupling portion of the nipple 14 constituting the inlet flow path to the first side wall 13A on the upstream side of the sub tank 13 is configured as the inlet opening 14a having a circular hole shape. A coupling portion of the nipple 15 constituting the outlet flow path to the sub tank 13 is configured as the outlet opening 15a having a circular hole shape at the lower portion of the second side wall 13B on the downstream side of the sub tank 13. Accordingly, the inlet opening 14a and the outlet opening 15a are opened to face each other in the flow direction of the coolant.

The bottom small wall 16 is provided inside the sub tank 13. The bottom small wall 16 is provided downstream of the main flow of the coolant from the inlet opening 14a to the outlet opening 15a relative to the emission port 17a and in a protruding manner upward in the sub tank 13 from the bottom wall 13C of the sub tank 13. In the present embodiment, the bottom small wall 16 having a plate shape that is serving as a vertical wall is provided in a protruding manner with a substantially vertically standing state, on an inner surface of the bottom wall 13C of the sub tank 13 at a position close to the outlet opening 15a on the downstream side. The bottom small wall 16 constitutes the flow adjuster for adjusting the flow of the coolant flowing from the inlet opening 14a into the sub tank 13 so as to be directed upward.

As illustrated in FIGS. 2 and 3, the bottom small wall 16 according to the present embodiment is disposed substantially parallel to the first side wall 13A and the second side wall 13B across the entire width of the sub tank 13.

As illustrated in FIG. 1, a height $h_3$ of the bottom small wall 16 is set to be equal to or shorter than a center height (a height from the bottom surface of the sub tank 13 to a center of the outlet opening 15a) $h_0$ of the outlet opening 15a ($h_3 \leq h_0$), so that the bottom small wall 16 does not excessively block the main flow of the coolant flowing out from the outlet opening 15a. As an example, in the present embodiment, the height $h_3$ of the bottom small wall 16 is set to from about ¼ to about ⅕ of a height H of the sub tank 13 ($H/5 \leq h_3 \leq H/4$). Although the bottom small wall 16 is employed as the flow adjuster in the present embodiment, the configuration of the flow adjuster is not limited to this. For example, as the flow adjuster, a configuration can be employed in which the nipple 15 on the downstream side constituting the outlet flow path is disposed to be offset at a position higher than a position of the nipple 14 on the upstream side constituting the inlet flow path, or the nipple 14 on the upstream side is coupled to be directed obliquely upward toward the inside of the sub tank 13.

Figure 4A:
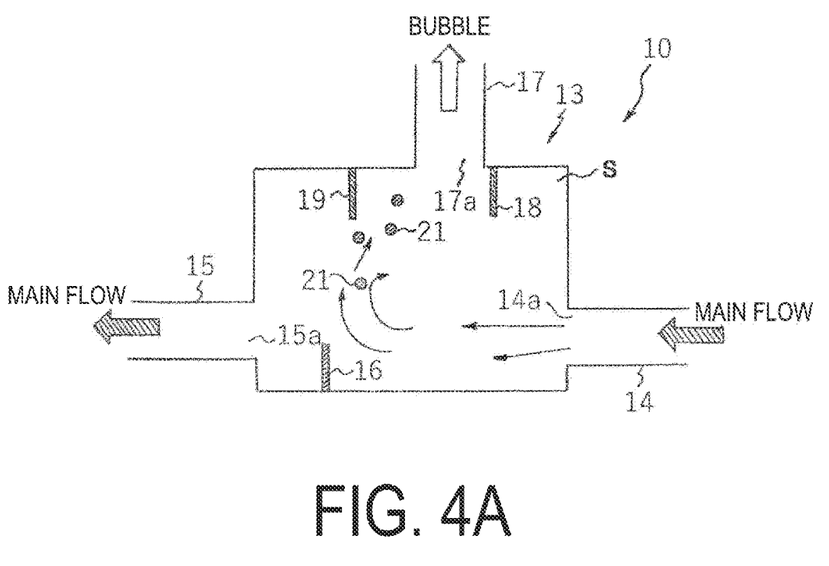
FIG. 4A is a conceptual vertical cross-sectional view of the reserve tank illustrating an action of the gas-liquid separation mechanism.
Figure 4B:
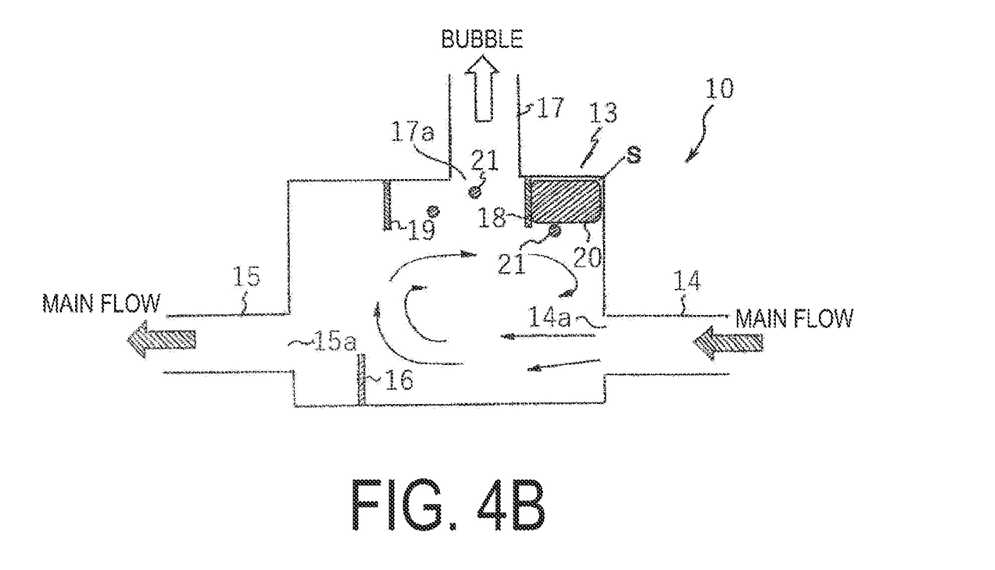
FIG. 4B is a conceptual vertical cross-sectional view of the reserve tank illustrating an action of the gas-liquid separation mechanism.

With the bottom small wall 16, the flow of the coolant is adjusted such that the coolant flowing in the sub tank 13 hits against the bottom small wall 16, rises as illustrated in FIGS. 4A and 4B, and then flows backward on the upper side inside the sub tank 13, that is, a vertical vortex is generated.

A nipple 17 having a circular cylindrical shape is substantially vertically coupled at a position closer to the upstream side (closer to the right in FIG. 1) on a center in a width direction of the upper wall 13D of the sub tank 13. One end portion in the longitudinal direction of the communicating pipe 116 illustrated in FIG. 8 is coupled to the nipple 17. The nipple 17 is opened as the emission port 17a having a circular hole shape at the upper wall 13D of the sub tank 13 for emitting bubbles separated from the coolant.

The first small wall 18 and the second small wall 19 constituting the gas-liquid separation mechanism 10 are provided in a protruding manner downward from the upper wall 13D of the sub tank 13, in the sub tank 13. Hereinafter, the first small wall 18 and the second small wall 19 of the present embodiment will be described in detail.

On the inner surface of the upper wall 13D of the sub tank 13 upstream of the emission port 17a (on the right side in FIG. 1, or downstream of the emission port 17a in the direction in which the coolant flows backward by the flow adjuster), the first small wall 18 having a rectangular plate shape is substantially vertically provided in a protruding manner downward, as a vertical wall to retain and catch the bubbles. Similarly, on the upper wall 13D of the sub tank 13 downstream in the main flow of the coolant relative to the emission port 17a (on the left side in FIG. 1, or upstream of the emission port 17a in the direction in which the coolant flows backward), the second small wall 19 having a rectangular plate shape is substantially vertically provided in a protruding manner downward, as a vertical wall to suppress turbulence of the coolant guided upward by the bottom small wall 16.

As illustrated in FIG. 2, the first small wall 18 and second small wall 19 having the rectangular plate shape are disposed substantially parallel to the first and second side walls 13A and 13B, respectively, across the entire width of the sub tank 13. In the present embodiment, as an example, a height $h_1$ of the first small wall 18 and a height $h_2$ of the second small wall 19 are set to be equal ($h_1 = h_2$). Similar to the height $h_3$ of the bottom small wall 16, as an example, in the present embodiment, the height $h_1$ of the first small wall 18 and the height $h_2$ of the second small wall 19 are set to from about ¼ to about ⅕ of the overall height H of the sub tank 13 (H/5≤$h_1$=$h_2$≤H/4). The heights $h_1$ and $h_2$ of the small walls may be different from each other.

The heights $h_1$ and $h_2$ of the first and second small walls 18 and 19, respectively, and the height $h_3$ of the bottom small wall 16 are not limited to the above-described ranges and can be appropriately changed. For example, the heights $h_1$ and $h_2$ of the first and second small walls 18 and 19, respectively, may be different from each other. In the present embodiment, each of the small walls 16, 18, and 19 is disposed across the entire region in the width direction of the sub tank 13, but the present disclosure is not limited to this, and each of the small walls 16, 18, and 19 may be disposed in a part in the width direction. For example, the bottom small wall 16 is disposed on a straight line extending from the inlet opening 14a to the outlet opening 15a to generate a rising flow.

In the sub tank 13 configured as described above, the gas-liquid separation mechanism 10 includes the bottom small wall 16, the first small wall 18, and the second small wall 19. Although illustration and detailed description of the configuration of the main tank 12 are omitted, an opening for replenishing the main tank 12 with the coolant is included at an upper end of the main tank 12, and the opening is closed by a cap. The cap is provided with a valve (relief valve). As will be described below, bubbles separated from the coolant by the gas-liquid separation mechanism 10 provided in the sub tank 13 are introduced into the main tank 12 through the communicating pipe 116 by buoyancy. When an internal pressure of the main tank 12 exceeds a predetermined value, the valve provided in the cap is opened to emit the air in the main tank 12 to the atmosphere.

Action of Gas-Liquid Separation Mechanism

Next, an action of the gas-liquid separation mechanism according to the disclosure will be described below with reference to FIGS. 4A to 4C.

Figure 4C:
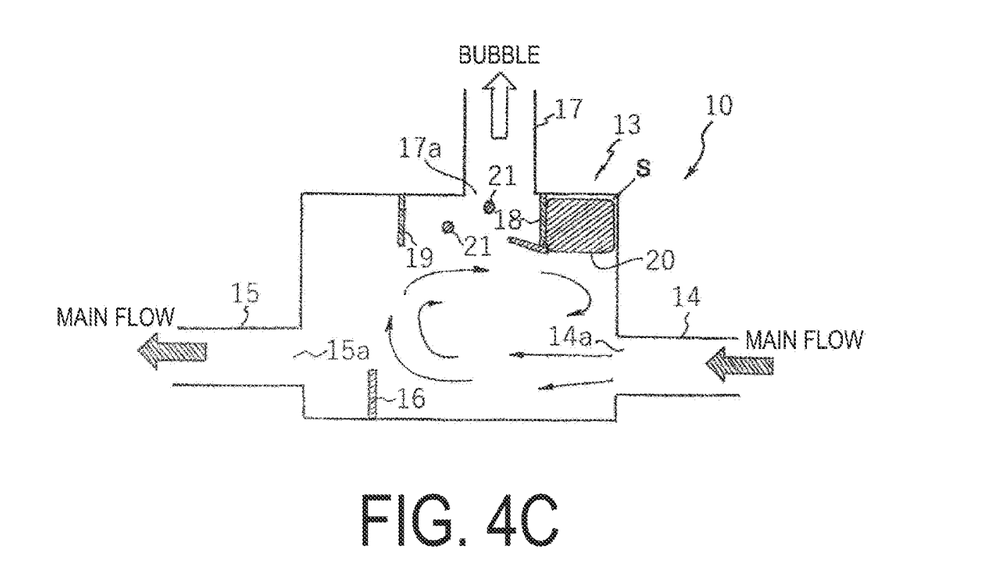
FIG. 4C is a conceptual vertical cross-sectional view of the reserve tank illustrating an action of the gas-liquid separation mechanism.

FIGS. 4A to 4C are vertical cross-sectional views of the sub tank 13 illustrating actions of the gas-liquid separation mechanism according to the disclosure. The coolant that has been used to cool the power conversion device 130 and the oil cooler 140 serving as the heat generating equipment substantially horizontally flows, as the main flow, from the inlet opening 14a of the nipple 14 on the upstream side into the lower space inside the sub tank 13 as illustrated in FIG. 4A. Then, in the main flow of the coolant having flowed into the lower space inside the sub tank 13, a part of the main flow is guided upward by the bottom small wall 16 in a process of the main flow flowing to the outlet opening 15a on the downstream side. Most of the coolant other than the part of the main flow is suctioned from the outlet opening 15a to the suction side of the liquid pump 110 through the pipe 115 illustrated in FIG. 8 via the nipple 15 on the downstream side.

As described above, a part of the coolant having flowed into the lower space inside the sub tank 13 from the inlet opening 14a is guided upward by the bottom small wall 16, so that large and small bubbles 21 contained in the coolant also move upward as illustrated in FIG. 4A. In the sub tank 13, the coolant guided upward by the bottom small wall 16 flows backward from the outlet opening 15a side to the inlet opening 14a side in the upper space inside the sub tank 13, and a vertical vortex (tumble) is generated.

The vertical vortex is generated in the sub tank 13 by the flow of the coolant. However, the first small wall 18 and the second small wall 19 are provided in a protruding manner on the upstream side and the downstream side, respectively, of the emission port 17a on the upper wall 13D of the sub tank 13 in the upper space inside the sub tank 13, so that the flow of the coolant in the upper space inside the sub tank 13 near the emission port 17a is not greatly affected by the vertical vortex, due to a flow straightening action of the first small wall 18 and the second small wall 19. Thus, the bubbles 21 contained in the coolant flowing to the upper space inside the sub tank 13 stay in the upper space inside the sub tank 13, and a part of the bubbles flows into the main tank 12 illustrated in FIG. 8 from the emission port 17a through the nipple 17 and the communicating pipe 116 illustrated in FIG. 8 by buoyancy and is collected. When the internal pressure of the main tank 12 exceeds a predetermined value as a result of the collection of the bubbles 21 in the main tank 12, the valve (relief valve) provided in the cap (not illustrated) of the main tank 12 is opened to emit air into the atmosphere as described above.

A corner portion of the upper space inside the sub tank 13 has a space S partitioned by the first small wall 18. The bubbles 21 staying in the upper space inside the sub tank 13 flow into the space S inside the sub tank 13 to form an air layer in the space S as illustrated in FIG. 4B, so that the air layer gradually increases in volume. Then, a bubble 20 increased in volume in the space S catches the bubbles 21 having small sizes approaching the bubble 20, and the bubble 20 gradually increases in volume. Then, the bubble 20 having a large size in the space S continues to catch the bubbles 21 having small sizes in the vicinity of the bubble and grows large. When the bubble 20 exceeds the space S in volume, as illustrated in FIG. 4C, a part of the bubble 20 in the space S flows out of the space S over the first small wall 18, flows into the main tank 12 from the emission port 17a through the nipple 17 and the communicating pipe 116 illustrated in FIG. 8, and is collected by the main tank 12.

With the above action repeated, the separation of the bubbles contained in the coolant flowing into the sub tank 13 from the coolant is promoted. The bubbles separated from the coolant are collected in the main tank 12, so that the bubbles contained in the coolant flowing out from the sub tank 13 to the pipe 115 illustrated in FIG. 8 and suctioned into the liquid pump 110 can be reduced. Thus, the occurrence of the malfunction of the liquid pump 110 due to air suction is suppressed, and stable operation of the liquid pump 110 is ensured.

The gas-liquid separation mechanism 10 according to the present embodiment described above has a simple structure in which the bottom small wall 16 having a rectangular plate shape that is serving as the flow adjuster is provided in a protruding manner on the bottom wall 13C of the sub tank 13, and the first small wall 18 and the second small wall 19 also having a rectangular plate shape are provided in a protruding manner on the upper wall 13D of the sub tank 13. Thus, the structure for the gas-liquid separation can be simplified, and the structure of the sub tank 13 including the gas-liquid separation mechanism can also be simplified, so that the manufacturing cost of the sub tank 13 can be reduced.

In the cooling system 100 according to the present embodiment, with the configuration in which the reserve tank 11 is divided into the main tank 12 and the sub tank 13, and the gas-liquid separation mechanism 10 is provided in the sub tank 13, the main tank 12 can be simplified in the structure and reduced in size. The inside of the sub tank 13 can be filled with the coolant, and thus the problem of air suction into the liquid pump 110 can be effectively solved.

Modification

Next, modifications of the disclosure will be described.

First Modification

Figure 5:
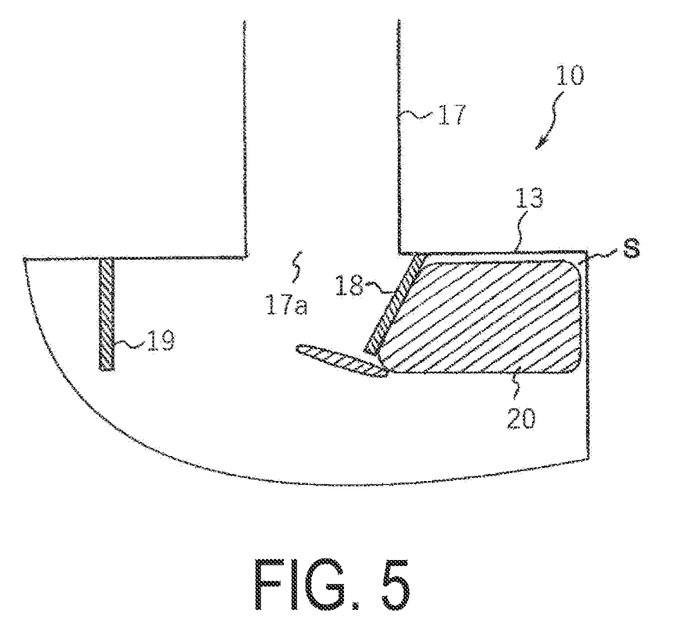
FIG. 5 is a conceptual partial vertical cross-sectional view of a reserve tank illustrating a first modification of the disclosure.

In the above-described embodiment, the first small wall 18 constituting a part of the gas-liquid separation mechanism 10 is provided in a protruding manner vertically downward on the inner surface of the upper wall 13D of the sub tank 13, but as illustrated in FIG. 5, the first small wall 18 may be obliquely inclined so that a lower end of the first small wall 18 faces the center of the emission port 17*a*.

The first small wall 18 is provided in a protruding manner with an obliquely inclined state as described above, so that the volume of the space S defined in the upper space inside the sub tank 13 by the first small wall 18 can be secured to be large, and a large number of bubbles 20 can stay in the space S. In emitting the bubble 20 accumulated in the space S from the space S, the bubble 20 can be smoothly guided to the emission port 17*a* along an inclined surface of the first small wall 18.

Second Modification

Figure 6:
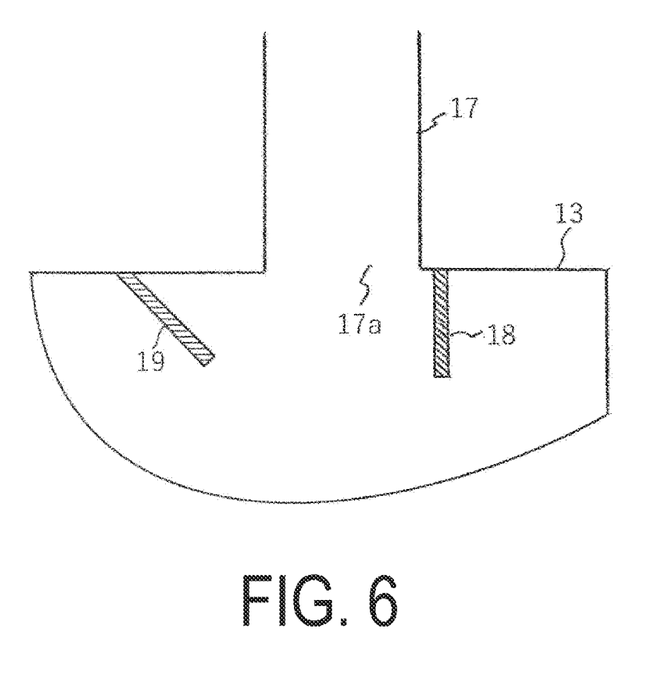
FIG. 6 is a conceptual partial vertical cross-sectional view of a reserve tank illustrating a second modification of the disclosure.

In the above-described embodiment, the second small wall 19 constituting a part of the gas-liquid separation mechanism 10 is provided in a protruding manner vertically downward on the inner surface of the upper wall 13D of the sub tank 13, but as illustrated in FIG. 6, the second small wall 19 may be obliquely inclined so that a lower end of the second small wall 19 faces the center of the emission port 17*a*.

The second small wall 19 is provided in a protruding manner with an obliquely inclined state as described above, so that the turbulence of the coolant guided upward by the bottom small wall 16 that is serving as the flow adjuster can be effectively suppressed.

Third Modification

Figure 7:
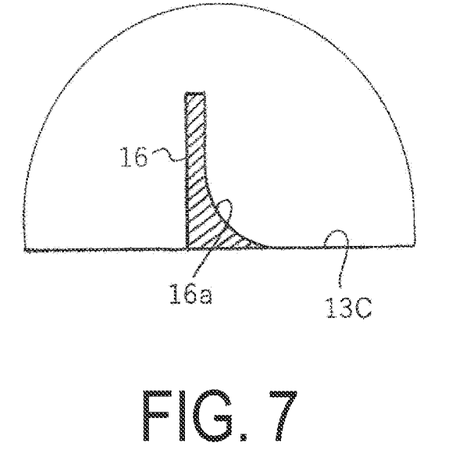
FIG. 7 is a conceptual partial vertical cross-sectional view of a reserve tank illustrating a third modification of the disclosure.

In this modification, as illustrated in FIG. 7, the bottom small wall 16 constituting the flow adjuster has a smooth arc concave curved surface 16*a* on a side (upstream side) where the coolant hits against and is guided. With a configuration in which the bottom small wall 16 has such a curved surface, the main flow of the coolant flowing from the inlet opening 14*a* into the lower space inside the sub tank 13 can be efficiently and smoothly guided upward, and the vertical vortex can be generated in the sub tank 13.

The embodiment is described above in which the disclosure is applied to the gas-liquid separation mechanism 10 of the reserve tank 11 (sub tank 13) provided in the cooling system 100 of the vehicle; however, the disclosure is similarly applicable to a gas-liquid separation mechanism of a reserve tank provided in any cooling system other than of the vehicle.

In the above-described embodiment, the example is described in which the reserve tank 11 is divided into the main tank 12 and the sub tank 13, and the gas-liquid separation mechanism is provided in the sub tank 13; however, the disclosure can also be applied to a gas-liquid separation mechanism provided in a single reserve tank.

Note that the disclosure is not limited to the above-described embodiments, and various changes can be made without departing from the spirit of the disclosure.

According to the disclosure, an effect of efficiently separating bubbles contained in a coolant can be obtained with a simple configuration.

The invention claimed is:

1. A gas-liquid separation mechanism of a reserve tank, the gas-liquid separation mechanism being configured to separate gas bubbles contained in a coolant flowing into the reserve tank provided in a circulation path of the coolant, the gas-liquid separation mechanism comprising:
    an inlet opening for the coolant, the inlet opening being provided on a first side wall of the reserve tank;
    an outlet opening for the coolant, the outlet opening provided on a second side wall opposite to the first side wall;
    a bubble emission port provided on an upper wall of the reserve tank and configured to emit the gas bubbles separated from the coolant;
    a flow adjuster that is a plate arranged at a position closer to the outlet opening than the inlet opening and which protrudes upward off from a bottom of the reserve tank as to have a free edge positioned below the upper wall, and the flow adjuster plate extending parallel to the first side wall and the second side wall across the entire width of the bottom of the reserve tank so as to adjust a flow of the coolant having flowed in from the inlet opening and make the flow rise and flow backward; and
    a first downward protruding wall that is a plate protruding downward from the upper wall of the reserve tank, and arranged, on the inlet opening side relative to the bubble emission port, parallel to the first side wall and the second side wall across the entire width of the upper wall.

2. The gas-liquid separation mechanism of the reserve tank according to claim 1, further comprising a second downward protruding wall provided upstream of the bubble emission port in the direction where the flow flows backward, the second downward protruding wall protruding downward from the upper wall.

3. The gas-liquid separation mechanism of the reserve tank according to claim 1, wherein the first downward protruding wall is inclined in a state of a lower end of the first small wall facing a center of the bubble emission port.

4. The gas-liquid separation mechanism of the reserve tank according to claim 2, wherein the first downward protruding wall is inclined in a state of a lower end of the first downward protruding wall facing a center of the bubble emission port.

5. The gas-liquid separation mechanism of the reserve tank according to claim 2, wherein the second downward protruding wall is inclined such that a lower end of the second downward protruding wall faces the center of the bubble emission port.

6. The gas-liquid separation mechanism of the reserve tank according to claim 1, wherein the flow adjuster is provided downstream in a main flow of the coolant flowing from the inlet opening to the outlet opening relative to the bubble emission port.

7. The gas-liquid separation mechanism of the reserve tank according to claim 2, wherein the flow adjuster is provided downstream in a main flow of the coolant flowing from the inlet opening to the outlet opening relative to the bubble emission port.

8. The gas-liquid separation mechanism of the reserve tank according to claim 1, wherein the free edge of the flow adjuster is at a height equal to or less than a height from the bottom of the reserve tank to a center of the outlet opening.

9. The gas-liquid separation mechanism of claim 1, wherein the inlet and outlet openings each have a central axis that is positioned at a vertical height above the bottom of the reserve tank.

10. The gas-liquid separation mechanism of claim 1, wherein the free edge of the flow adjuster is positioned at a height above a lower most edge of the outlet opening.

11. The gas-liquid separation mechanism of claim 2, wherein the second downward protruding plate extends parallel to the first side wall and the second side wall across the entire width of the upper wall.

12. The gas-liquid separation mechanism of claim 1, wherein a vertical height (h3) of the flow adjuster is set to from about ¼ to about ⅕ of an overall height (H) of the reserve tank (H/5≤h3≤H/4).

13. The gas-liquid separation mechanism of claim 12, wherein the height ($h_1$) of the first downward protruding wall and the height ($h_2$) of the second downward protruding wall are set to be from about ¼ to about ⅕ of the overall height H of the reserve tank (H/5≤$h_1$, $h_2$≤H/4).

14. The gas-liquid separation mechanism of claim 2, wherein the height ($h_1$) of the first downward protruding wall and the height ($h_2$) of the second downward protruding wall are set to be from about ¼ to about ⅕ of the overall height H of the reserve tank (H/5≤$h_1$, $h_2$≤H/4).

15. The gas-liquid separation mechanism of claim 2, wherein the height ($h_1$) of the first downward protruding wall and the height ($h_2$) of the second downward protruding wall are set to be equal.

16. The gas-liquid separation mechanism of claim 1, wherein the plate of the flow adjuster stands entirely in a vertical plane orientation relative to a horizontal plane defined by the horizontally extending surface of the bottom of the flow adjuster.

17. The gas-liquid separation mechanism of claim 1, wherein a central axis of each of the inlet and outlet openings coincide.

* * * * *